US012035153B2

(12) United States Patent
Birr et al.

(10) Patent No.: US 12,035,153 B2
(45) Date of Patent: *Jul. 9, 2024

(54) SYSTEMS AND METHODS FOR ANALYZING AND ADJUSTING ANTENNA PAIRS IN A MULTIPLE-INPUT MULTIPLE-OUTPUT ("MIMO") SYSTEM USING IMAGE SCORING TECHNIQUES

(71) Applicant: Verizon Patent and Licensing Inc., Basking Ridge, NJ (US)

(72) Inventors: Jason A. Birr, Wesley Chapel, FL (US); Katrina Adams, Arlington, MA (US); Brian A. Ward, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/488,603

(22) Filed: Sep. 29, 2021

(65) Prior Publication Data
US 2022/0022059 A1 Jan. 20, 2022

Related U.S. Application Data

(63) Continuation of application No. 16/858,852, filed on Apr. 27, 2020, now Pat. No. 11,159,961.

(51) Int. Cl.
*H04W 24/02* (2009.01)
*H04B 7/0413* (2017.01)

(52) U.S. Cl.
CPC .......... *H04W 24/02* (2013.01); *H04B 7/0413* (2013.01)

(58) Field of Classification Search
CPC ..... H04W 24/08; H04W 12/79; H04W 12/10; H04W 12/12; H04W 12/63; H04W 24/10; H04W 72/0453; H04W 24/02; H04W 72/0406; H04W 24/04; H04W 36/0033; H04W 4/02; H04W 4/025; H04W 4/029; H04W 72/082; H04W 74/0816; H04W 8/18; H04W 16/28; H04W 24/00; H04W 28/04; H04W 4/026; H04W 52/0229; H04W 52/225; H04W 52/0245; H04W 52/0251; H04W 52/24; H04W 74/0808; H04W 76/10; H04W 84/042; H04W 88/18; H04B 1/1027; H04B 10/07953;
(Continued)

(56) References Cited

U.S. PATENT DOCUMENTS 7,933,557 B1 * 4/2011 Townley ............... H04L 41/147
455/67.11
11,159,961 B1 * 10/2021 Birr ....................... H04W 24/04
(Continued)

*Primary Examiner* — Nizar N Sivji
*Assistant Examiner* — Jing Gao

(57) ABSTRACT

A system described herein may provide a technique for the analysis of antennas in a wireless network, and the ensuing detection of misaligned antennas. Images reflecting measures of interference associated with different antennas may be analyzed based on structural similarity index ("SSIM") or other similarity analysis techniques, and antennas may be paired according to this analysis. The paired antennas may be compared to a known configuration. Mismatches may indicate misalignment or other malfunctions, based on which automated remedial measures (e.g., antenna realignment) may be performed.

20 Claims, 13 Drawing Sheets

(58) Field of Classification Search
CPC .. H04B 17/0085; H04B 17/10; H04B 17/336; H04B 1/7097; H04B 7/04; H04B 17/00; H04B 7/0452; H04B 7/0413; H04B 17/345; H04B 17/373; H04B 17/3913; H04B 1/7103; H04B 7/0691; H04B 7/0608; G01S 5/021; G01S 5/0215; G01S 5/0221; G01S 19/21

See application file for complete search history.

(56) References Cited

U.S. PATENT DOCUMENTS

| | | | |
|---|---|---|---|
| 2008/0129316 A1* | 6/2008 | Zoughi | G01N 22/02 324/637 |
| 2010/0120415 A1* | 5/2010 | Urquhart | H04B 17/318 455/424 |
| 2016/0036508 A1* | 2/2016 | Szini | H04B 17/00 375/227 |
| 2021/0142160 A1* | 5/2021 | Mohseni | G06F 18/24 |

* cited by examiner

Highest scoring pair

SYSTEMS AND METHODS FOR ANALYZING AND ADJUSTING ANTENNA PAIRS IN A MULTIPLE-INPUT MULTIPLE-OUTPUT ("MIMO") SYSTEM USING IMAGE SCORING TECHNIQUES

CROSS-REFERENCE TO RELATED APPLICATION

This Application is a Continuation of U.S. patent application Ser. No. 16/858,852, filed on Apr. 27, 2020, titled "SYSTEMS AND METHODS FOR ANALYZING AND ADJUSTING ANTENNA PAIRS IN A MULTIPLE-INPUT MULTIPLE-OUTPUT ("MIMO") SYSTEM USING IMAGE SCORING TECHNIQUES," the contents of which are herein incorporated by reference in their entirety.

BACKGROUND

Wireless network providers may utilize systems that make use of multiple antennas to transmit to or receive information from the same device. An example of such a system is a multiple-input and multiple-output ("MIMO") system, which may use multiple antennas to increase the capacity of a wireless link between a wireless network and a User Equipment ("UE").

DETAILED DESCRIPTION OF THE PREFERRED EMBODIMENTS

Figure 1:
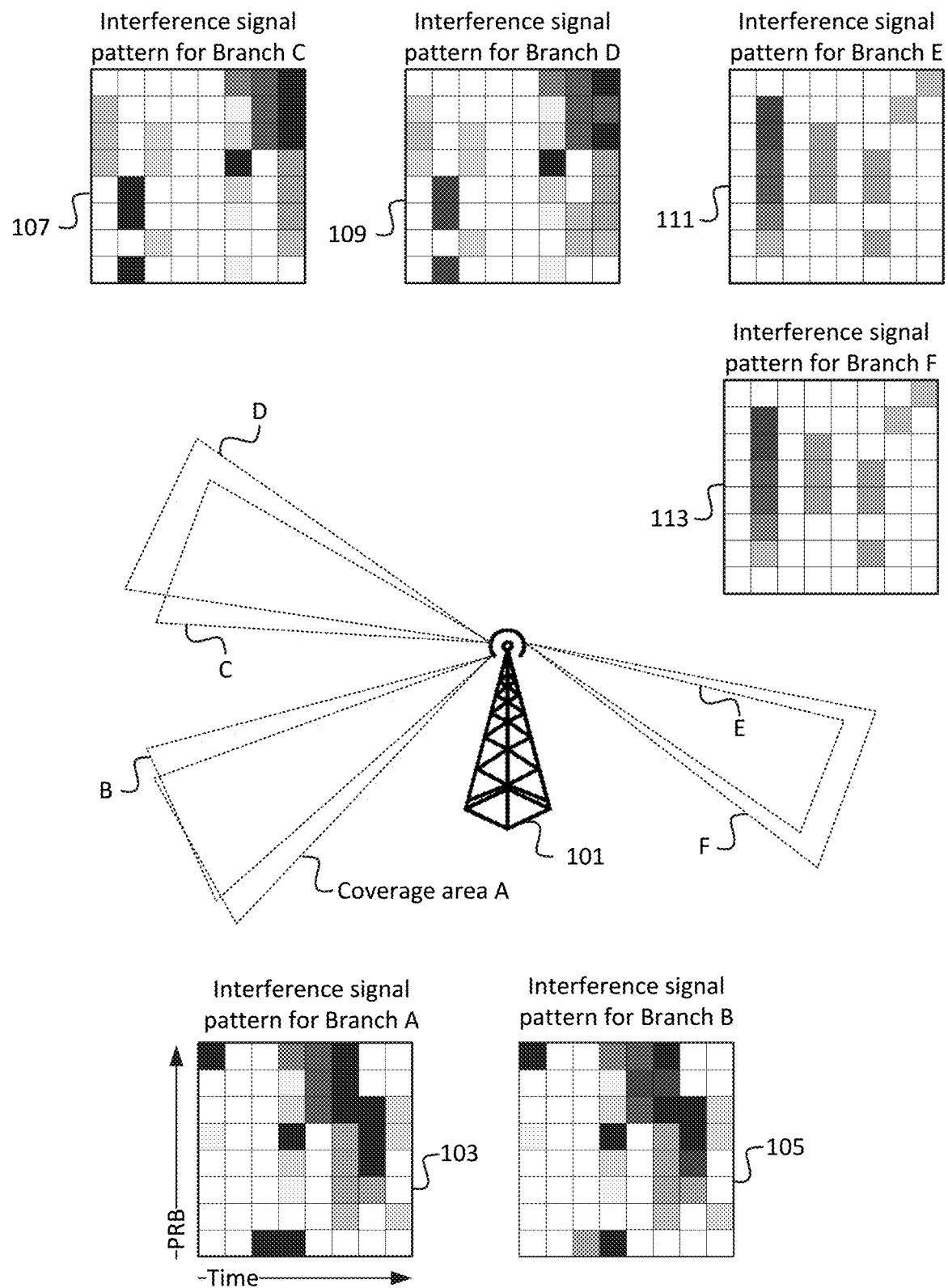
FIG. 1 illustrates an example of co-located antenna pairs, in which pairs of antennas face the same or similar direction, and images depicting the interference exhibited by each of these antennas.

The following detailed description refers to the accompanying drawings. The same reference numbers in different drawings may identify the same or similar elements.

Wireless networks, such as radio access networks ("RANs") or other types of wireless networks, may include multiple antennas located within the same geographic region. In some scenarios, multiple antennas (e.g., co-located antennas, or antennas located within a threshold distance of each other) may be used to enhance coverage or robustness of the network and/or reduce interference. Some network providers may utilize pairs of antennas (sometimes referred to as "cross-pole" or "cross-polarized" antennas) to provide the above features. In some situations, cross-pole antennas (and/or other pairs or sets of antennas) may be used to implement a MIMO system, which may improve the capacity of communications between a wireless network, such as a radio access network ("RAN") of a wireless network, and UEs that access the wireless network.

For example, in a MIMO system, pairs of cross-pole antennas (e.g., pairs of co-located cross-pole antennas, or pairs of cross-pole antennas that are located within a threshold distance of each other) may be aligned in order to provide MIMO functionality, which may include communicating with the same device or system (e.g., the same UE) via the pairs of cross-pole antennas. In this manner, four antennas (e.g., pairs of pairs of antennas) or more antennas (e.g., more than two pairs of cross-pole antennas) may be aligned to provide MIMO functionality.

Cross-pole antennas (e.g., in a MIMO system, or other suitable system) may experience radio frequency ("RF") interference in received signals, which may be measured as the difference between an expected signal pattern and a measured signal pattern. Antennas that are located relatively close to each other and facing similar directions may exhibit similar interference signal patterns, while antennas that are located relatively farther away from each other and/or facing different directions may exhibit different interference patterns. Thus, in a MIMO system (or other suitable configuration, in which multiple antennas are configured to face the same or similar direction), pairs of antennas may be expected to exhibit the same or similar interference patterns. However, mismatches in interference patterns for co-located antennas and/or antennas that are configured to face the same or similar direction may indicate an antenna alignment issue or other issue that may affect the optimal operation of the antennas.

Embodiments described herein provide for the detection of such alignment or other issues by analyzing interference patterns of multiple antennas, identifying potential pairs based on interference patterns associated with the antennas, and comparing the identified potential pairs to a known configuration of antenna pairs. For example, in some embodiments, an Alignment Detection and Remediation System ("ADRS") may analyze images that reflect the interference patterns (e.g., on a Physical Resource Block ("PRB") basis) over a given period of time for a set of antennas, and perform an image analysis on the images in order to determine a Structural Similarity Index ("SSIM") or other suitable measure of similarity between the images. Based on these similarity analyses, the potential pairs of antennas may be identified. If the identified potential pairs do not match the known configuration, then an alignment issue or other issue may be identified and remediated. For example, the ADRS may cause a misaligned antenna to be realigned (e.g., through an automated and/or programmatic realignment process), such that configured antenna pairs face the same or similar direction as expected.

FIG. 1 illustrates, for example, coverage areas A-F associated with node 101. Node 101 may be, or may include, an evolved NodeB ("eNB"), a Next Generation Node B ("gNB"), one or more Remote Radio Heads ("RRHs") associated with an eNB or gNB, one or more Distributed Units ("DUs") associated with a gNB, and/or some other suitable arrangement of physical antennas. Node 101 may implement a MIMO system or some other suitable system in which multiple antennas (e.g., cross-pole antennas, pairs of cross-pole antennas, etc.) are configured to face the same or similar direction. In this example, assume, for example, that coverage areas A and B are implemented by a pair of cross-pole antennas, which are configured to be oriented in the same or similar direction, and have different (e.g., orthogonal) polarities. Further assume that coverage areas C and D are implemented by another pair of cross-pole antennas, and that coverage areas E and F are implemented by yet another pair of cross-pole antennas.

Some of the above-mentioned pairs of coverage areas are shown in the figures as partially overlapping and partially non-overlapping (e.g., coverage areas A and B, and coverage areas C and D). In practice, the coverage area associated with one antenna may be entirely contained within the coverage area for a corresponding cross-pole antenna. For example, as shown, coverage area E may be entirely contained within coverage area F). In this manner, pairs of coverage areas may be considered as different "branches" of the same "sector," where the "sector" refers to the overall or cumulative coverage area associated with the coverage areas. For example, coverage areas A and B may be two branches of a first sector, coverage areas C and D may be two branches of second sector, and coverage areas E and F may be two branches of a third sector. As referred to herein, "Branch A" may refer to an antenna that provides coverage area A, "Branch B" may refer to an antenna that provides coverage area B, and so on.

Each branch may be associated with a different interference signal pattern. As noted above, generally speaking, antennas that are co-located and/or facing similar directions may exhibit the same or similar interference signal patterns. Interference signal patterns may be represented in the form of images, which may reflect the amount of interference (e.g., which may be expressed in terms of decibels ("dBm") or some other suitable value) on a per-PRB basis, over a given time window. For example, image 103 may represent the interference exhibited at Branch A over a given time window, image 105 may represent the interference exhibited at Branch B over the same time window, image 107 may represent the interference exhibited at Branch C over the same time window, and so on.

In this figure, each of images 103-113 may be expressed in terms of a grid, where an X-axis of the grid denotes time, and a Y-axis of the grid denotes different PRBs. Thus, each square of the grid may represent a level of interference on a particular PRB (or range of PRBs) at a particular time window. The amount of interference, on a given PRB (or PRB range) at a given time (or during a given time window), may be denoted by the shading in the image. For example, darker shading may indicate a relatively high amount of interference, while lighter shading may indicate relatively lower interference.

For the sake of explanation, images 103-113 are shown and described herein as including shaded squares to indicate per-PRB interference. In practice, images that represent interference may be differently generated or presented. For example, while the amount of interference is represented here as shading, in practice, other representations are possible, such as different colors, the utilization of three-dimensional graphing (e.g., where the Z-axis represents amount of interference), etc.

As shown, images 103 and 105 may be relatively visually similar to each other, images 107 and 109 may be relatively visually similar to each other, and images 111 and 113 may be relatively visually similar to each other. Further, images 103 and 105 may be relatively visually dissimilar to images 107-113, and so on. The relative visual similarity of pairs of images may indicate that similar interference is exhibited at cross-pole antennas (e.g., branches of the same sector). As mentioned above, this may be an expected result of the branches being co-located and/or facing the same or similar direction. That is, the same interference source(s) may affect the same or similar PRBs of branches of the same sector, while not necessarily affecting other sectors.

Figure 2:
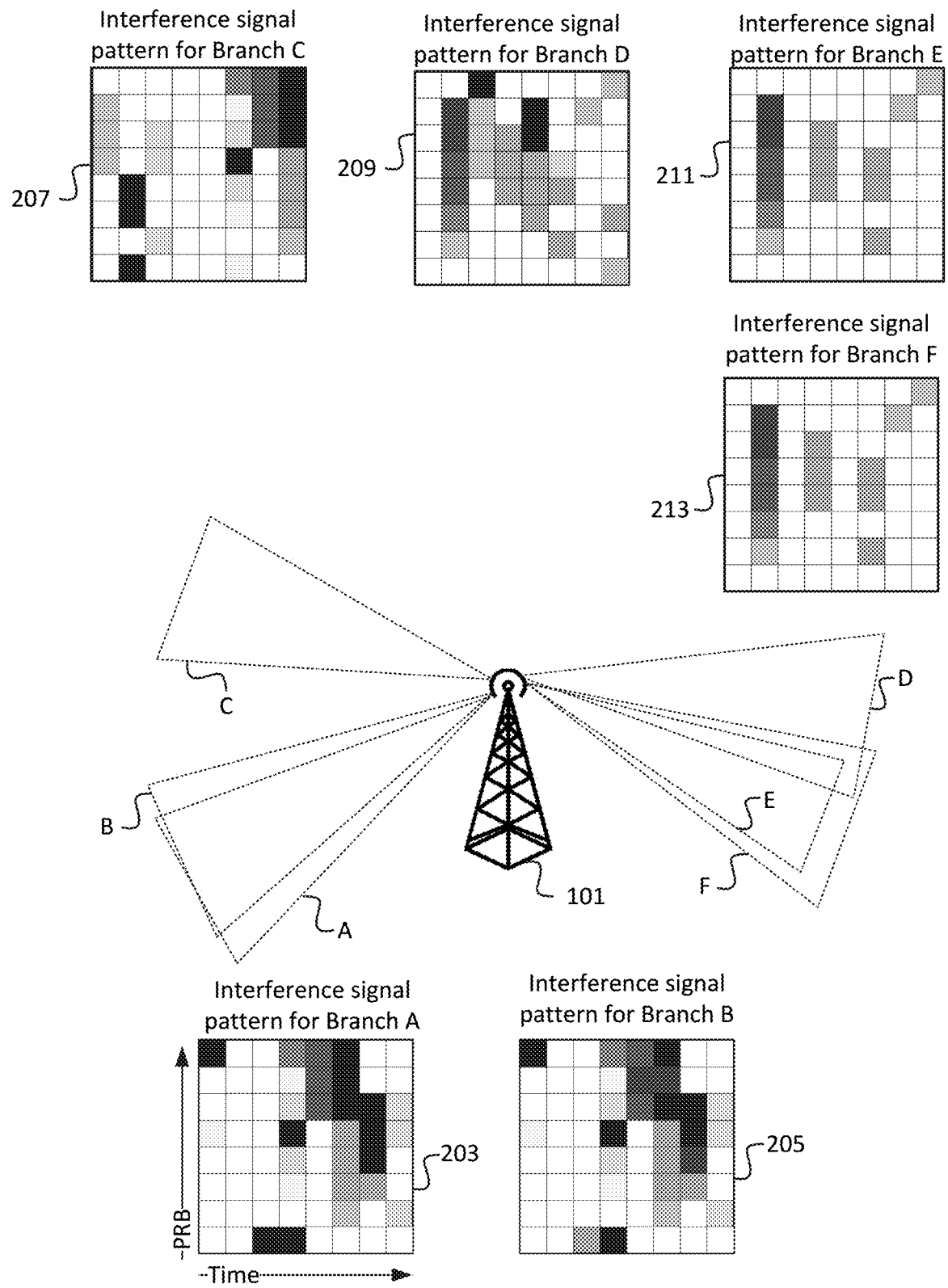
FIG. 2 illustrates an example of co-located antenna pairs, in which one or more antennas of a configured pair of antennas face substantially different directions, and images depicting the interference exhibited by each of these antennas.

FIG. 2, on the other hand, illustrates a scenario in which one or more of the branches are out of alignment. For example, as shown, Branch D may be differently aligned than shown in FIG. 1. Accordingly, images 203-213 may correspond to interference signal patterns exhibited by branches A-F during a given time window (e.g., a different time window than shown in FIG. 1). As shown, images 207 and 209 (associated with Branches C and D, respectively) may be relatively dissimilar, and/or less similar than images 107 and 109 shown in FIG. 1. The visual dissimilarity of these images may be indicative of different interference effects exhibited at these branches, which may indicate that the alignments of these branches are substantially different (e.g., out of alignment, for branches that are configured as aligned pairs).

As further shown, Branch D may be more aligned with Branches E and F than with Branch C. Accordingly, image 209 (associated with Branch D) may be more visually similar to images 211 and 213 (associated with Branches E and F) than to image 107 (associated with Branch C), even though Branches C and D are configured to be an aligned antenna pair (e.g., cross-pole antennas).

Figure 3:
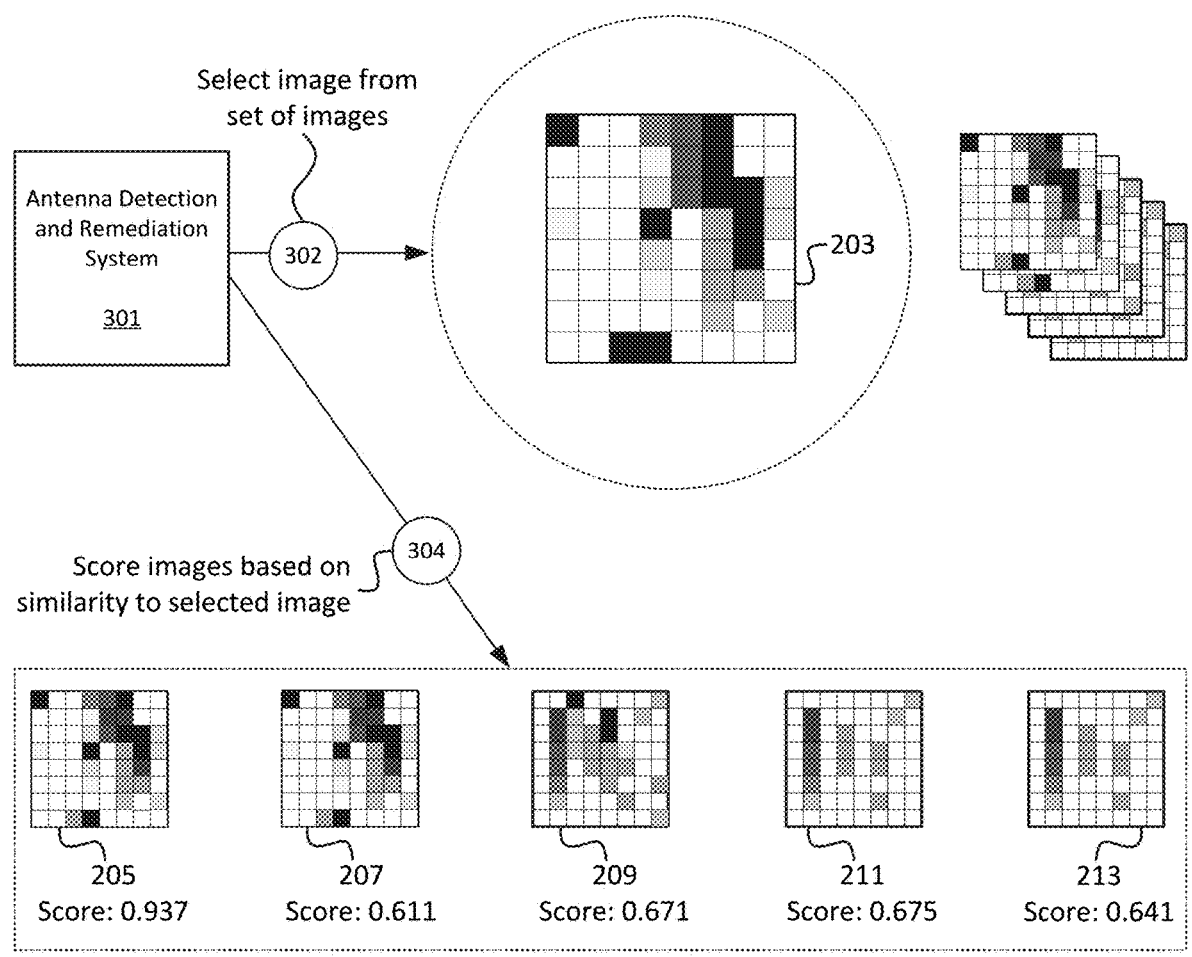
FIG. 3 illustrates an example scoring based on a measure of similarity of the interference exhibited at different antennas, in accordance with some embodiments.

FIG. 3 illustrates an example iteration of similarity scoring that ADRS 301 may perform, in accordance with some embodiments. As discussed above, ADRS 301 may identify potential antenna pairs (e.g., branches of the same sector) based on a similarity analysis of images associated with interference exhibited at the antennas. The example shown in FIG. 3 refers to example images 203-213, shown in FIG. 2.

As shown, for example, ADRS 301 may select (at 302) a particular image, against which to compare the other images. In this example, ADRS 301 may select (at 302) image 203, corresponding to Branch A. As discussed below, ADRS 301 may iteratively select different images against which to score the other images, where the iterative process may yield more complete information based on which ADRS 301 may determine potential antenna pairs. In some embodiments, the set of images from which ADRS 301 selects the image may be images associated with antennas that are located within the same geographic region (e.g., within a threshold distance of each other, situated on a same physical structure, etc.).

ADRS 301 may score (at 304) the remaining images (i.e., images 205-213, in this example) based on their similarity to selected image 203. In some embodiments, the similarity scoring may be performed on a per-pixel basis, where ADRS 301 compares corresponding pixels (e.g., pixels at the same position) of images of the same size and resolution. In some embodiments, ADRS 301 may normalize one or more of images 203-213 to have the same size and resolution, in situations where images 203-213 do not have the same size and/or resolution. The differences in brightness, hue, shade, and/or other characteristics on a per-pixel basis of images 203-213 may be used to determine a similarity score (e.g., a SSIM) between one or more of the images. In some embodiments, ADRS 301 may use some other suitable similarity scoring methodology to determine a measure of similarity between the selected image and the remaining image.

In this example, image 205 (associated with Branch B) may have a similarity score of 0.937 with respect to image 203 (e.g., where the similarity is measured according to a scale of 0-1, where a score of 0 indicates no or low similarity and a score of 1 indicates that the images are identical or are highly similar). This relatively high score may indicate a relatively high measure of similarity between images 203 and 205, and thus may indicate that the interference exhibited at these branches is relatively similar. As further shown, images 207-213 may have lower similarity scores (ranging from 0.611 to 0.675, in this example) with respect to image 203, indicating less similar interference exhibited at these branches.

Figure 4:
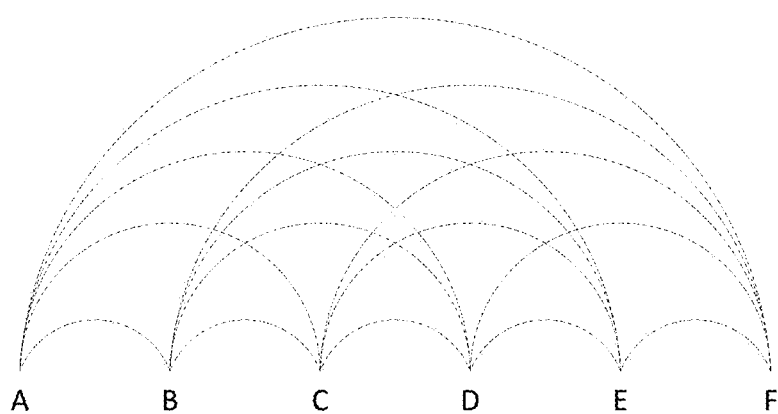
FIGS. 4-7 illustrate an example selection of unique antenna pairs, in accordance with some embodiments.

Once the similarity scores with respect to image 203 have been calculated, ADRS 301 may repeat similar operations, beginning with different images, until the similarity scores of each image with respect to each other image have been calculated. FIG. 4 illustrates example data structure 401, which may represent the results of calculating such similarity scores between each of images 203-213.

Data structure 401 may include horizontal and vertical axes corresponding to each branch. Each field in data structure may include the similarity score of the branches indicated by the respective axes. For example, a position in data structure 401 of {A, B} (or {B, A}) may indicate the similarity score associated between the corresponding associated with Branches A and B (e.g., the score of 0.937). As further shown, when comparing an image to itself, the resulting similarity score may be 1.00, indicated by shaded cells in data structure 401.

Figure 5:
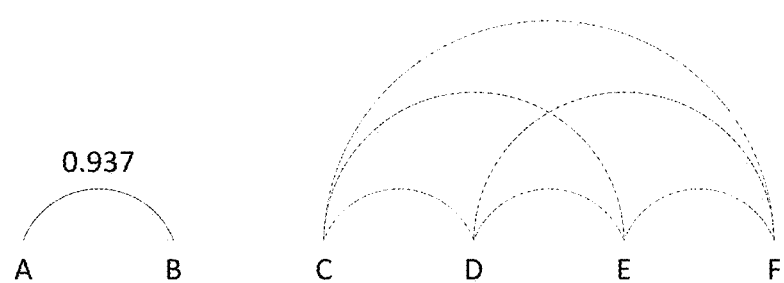

As referred to above, ADRS 301 may identify pairs of antennas (e.g., branches of the same sector) based on the similarity scores. The potential links between branches are illustrated in FIG. 4 via the dotted lines between Branches A-F. As shown in FIG. 5, ADRS 301 may first identify a link between Branch A and Branch B. This link is denoted in FIG. 5 as a solid line between "A" and "B." ADRS 301 may, for example, identify this link based on the similarity score between Branches A and B being the highest similarity score in data structure 401. That is, 0.937 is the highest similarity score (other than 1.00) in data structure 401, based on which ADRS 301 may identify Branches A and B as being a potential antenna pair.

Once identified as being part of a potential antenna pair, a branch may be ineligible to be linked to another antenna, as part of this iterative process. For example, as denoted by the lack of dashed lines from "A" and "B" in FIG. 5, Branches A and B may not be selectable when identifying a next pair. This ineligibility is also denoted in FIG. 6 by light gray shading in cells associated with Branches A and B.

Figure 6:
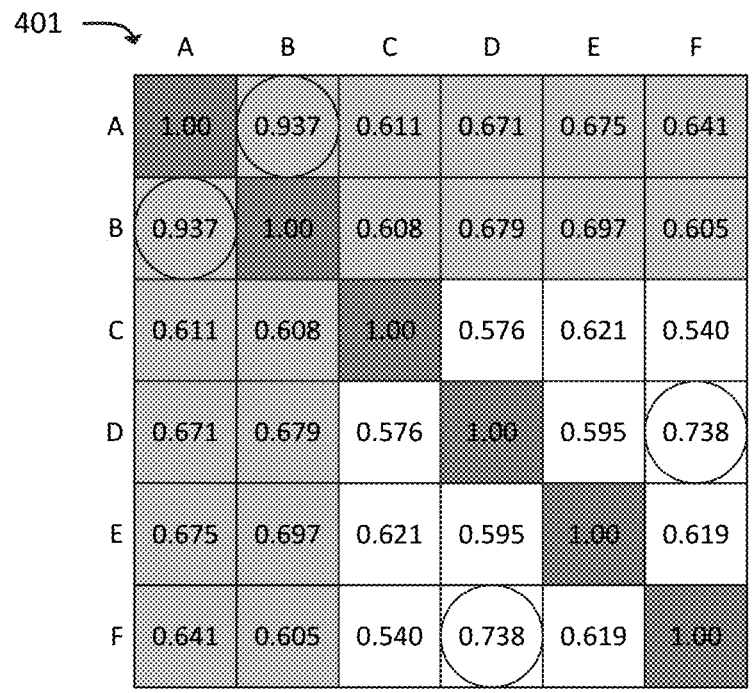
Figure 6:
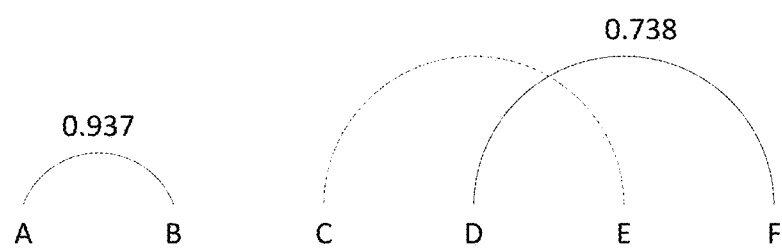

As further shown in FIG. 6, ADRS 301 may select the pair of Branches D and F based on the similarity score (i.e., 0.738, in this example) being the highest similarity score of the remaining similarity scores. As such, this potential link between Branches D and F may be denoted by the solid line between "D" and "F" in the figure, as well as the removal of dashed lines from "D" and "F."

Figure 7:
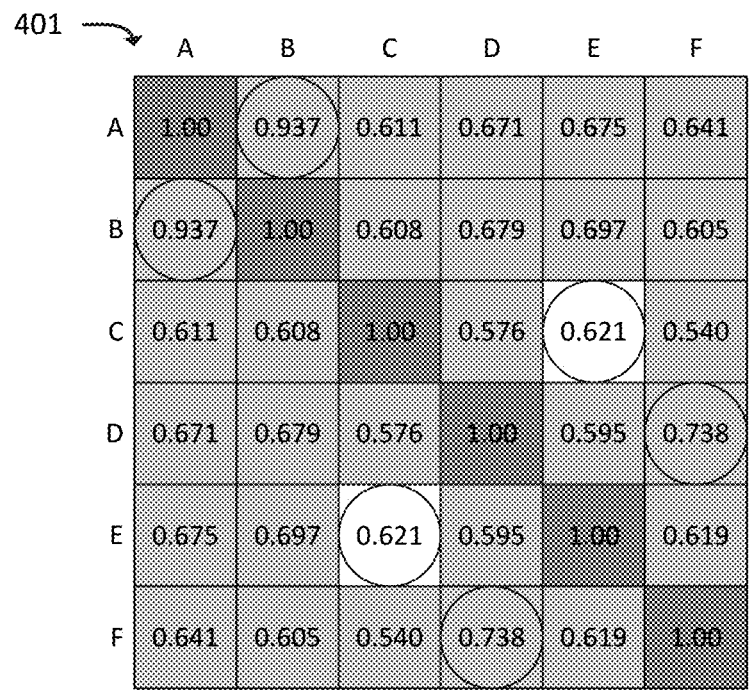
Figure 7:
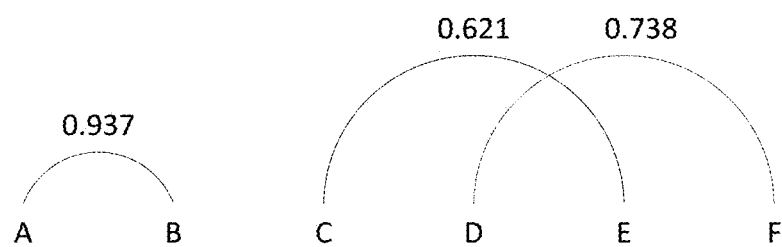

As finally shown in FIG. 7, the last remaining possible pair (i.e., Branches C and E) may be identified. Thus, the resulting potential pairs identified by ADRS 301, in accordance with the example selection process shown in FIGS. 5-7, may be {A, B}, {C, F}, and {D, E}.

However, as noted above, this pairing may be incorrect (e.g., based on an expected or configured pairing). For example, ADRS 301 may receive or maintain information indicating the indicated or expected pairs of antennas as configured (i.e., {A, B}, {C, D}, and {E, F}), and may thus determine a mismatch between the identified pairs and the expected pairs. As discussed below, based on detecting this mismatch, ADRS 301 may determine that one or more of these antennas are misaligned, and may effect remedial measures (e.g., initiating a realignment process, outputting one or more alerts, and/or some other suitable remedial measure).

Figure 8:
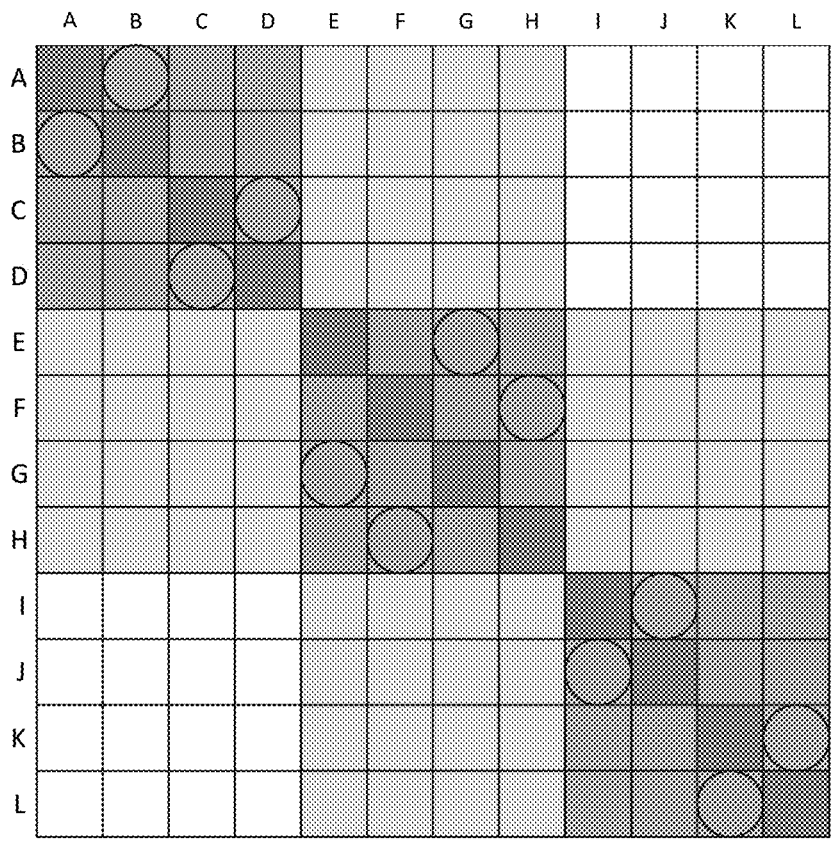
FIGS. 8 and 9 illustrate a first iteration of a selection of unique pairs and links, in accordance with some embodiments.
Figure 8:
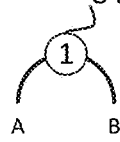
Figure 8:
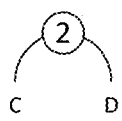
Figure 8:
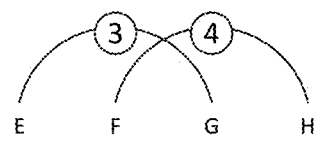
Figure 8:
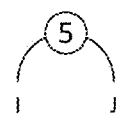
Figure 8:
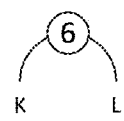

In some embodiments, once pairs of antennas have been identified, ADRS 301 may identify pairs of pairs (referred to herein as "links"). Links may refer to sets of antennas (e.g., in a MIMO) system, where two pairs of cross-pole antennas may be generally aligned in order to enhance RF capacity or robustness. For example, data structure 801, shown in FIG. 8, illustrates example similarity scores between twelve example branches A-L. In this figure, the similarity scores are denoted by different shading, where darker shading may indicate a higher similarity score compared to lighter shading.

As shown in FIG. 8, and in a manner similarly discussed above, ADRS 301 may pair Branches A and B based on these branches having the highest similarity score with respect to each other, creating Unique Pair "1" (as indicated by the "1" on the arc between "A" and "B" in the figure). ADRS 301 may further establish additional unique pairs, based on respective similarity scores, between Branches C and D (Unique Pair 2), Branches E and G (Unique Pair 3), Branches F and H (Unique Pair 4), Branches I and J (Unique Pair 5), and Branches K and L (Unique Pair 6). As shown, these pairs may be illustrated by the circle placed in data structure 801 as well as the solid lines connecting each branch.

Figure 9:
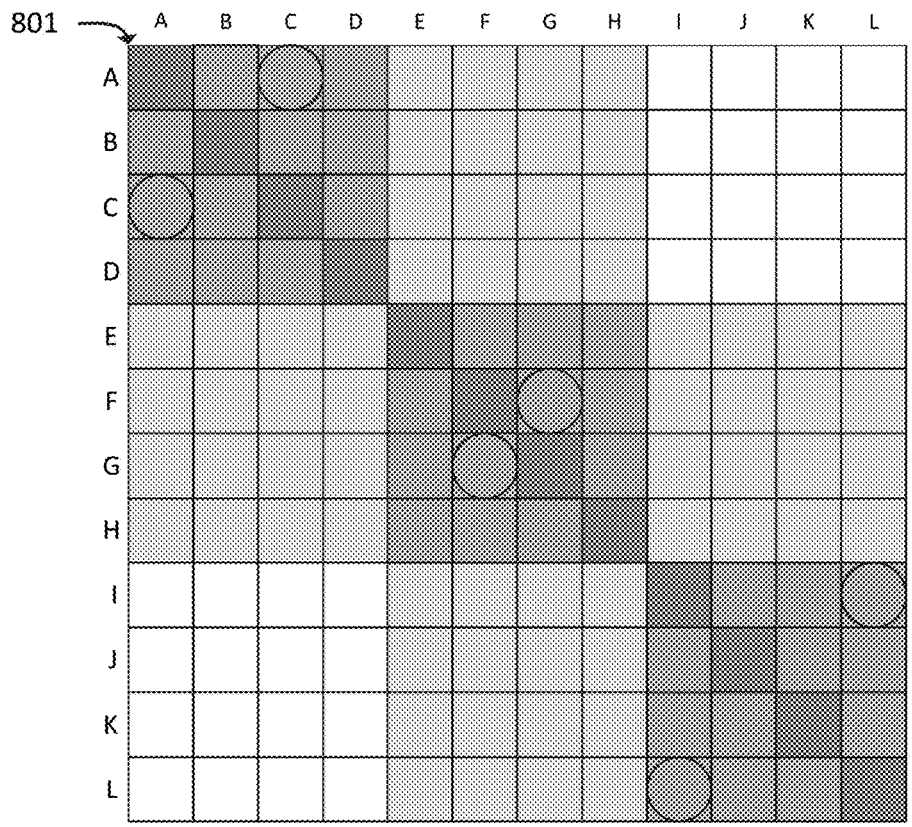
Figure 9:
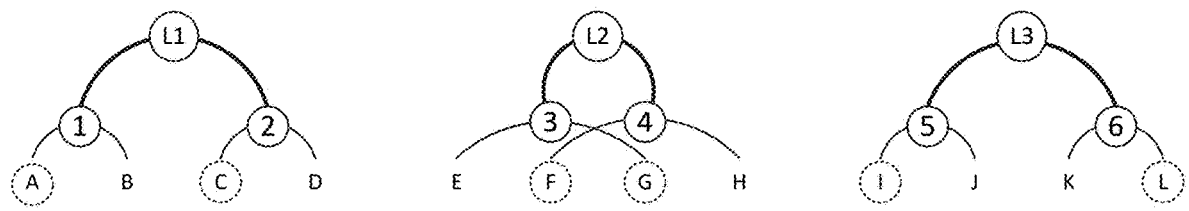

As shown in FIG. 9, ADRS 301 may identify links between these pairs. For example, ADRS 301 may select a particular pair (e.g., Unique Pair 1, between Branches A and B in this example), and may identify the highest similarity score between one of these branches and the other branches (e.g., Branches C-L in this example). In some embodiments, ADRS 301 may select Unique Pair 1 based on the similarity scores of the constituent branches being the highest similarity score of any of the identified unique pairs. As discussed below, when repeating this process iteratively, ADRS 301 may begin with a second-highest scoring unique pair in a second iteration, begin with a third-highest scoring unique pair in a third iteration, and so on. In some embodiments, ADRS 301 may select a starting unique pair using different selection methodology.

In this example, assume that ADRS 301 identifies that the similarity score between Branch A and Branch C is the highest similarity score between either branch of the selected unique pair (i.e., Branch A or B, in this example) and the remaining branches. As such, ADRS 301 may select Unique Pair 1 (which includes identified Branch A) and Unique Pair 2 (which includes identified Branch C) as a linked pair (e.g., Link 1, denoted by "L1" in the figure).

Once Linked Pair 1 has been identified, Unique Pairs 1 and 2 may be removed from consideration, and ADRS 301 may continue identifying links in a similar manner. For example, ADRS 301 may identify that the similarity score between Branches F and G is the highest similarity score (e.g., once Branches A-D have been removed from consideration) remaining in data structure 801, and may thus select Unique Pairs 3 and 4 (which include identified Branches F and G) as Link 2. As further shown, ADRS 301 may select Unique Pairs 5 and 6 as Link 3.

Once these links have been identified, ADRS 301 may compare the identified links to configuration information associated with a wireless network, which may indicate pairs of antennas and/or links. For example, as discussed above, the pairs of antennas may be associated with cross-pole antennas, while the links may be pairs of cross-pole antennas (e.g., in a MIMO system). If ADRS 301 has detected a link that does not correspond to an actual configured link, then ADRS 301 may determine that one or more of the evaluated antennas are mis-aligned, and may effect remedial measures.

Figure 10:
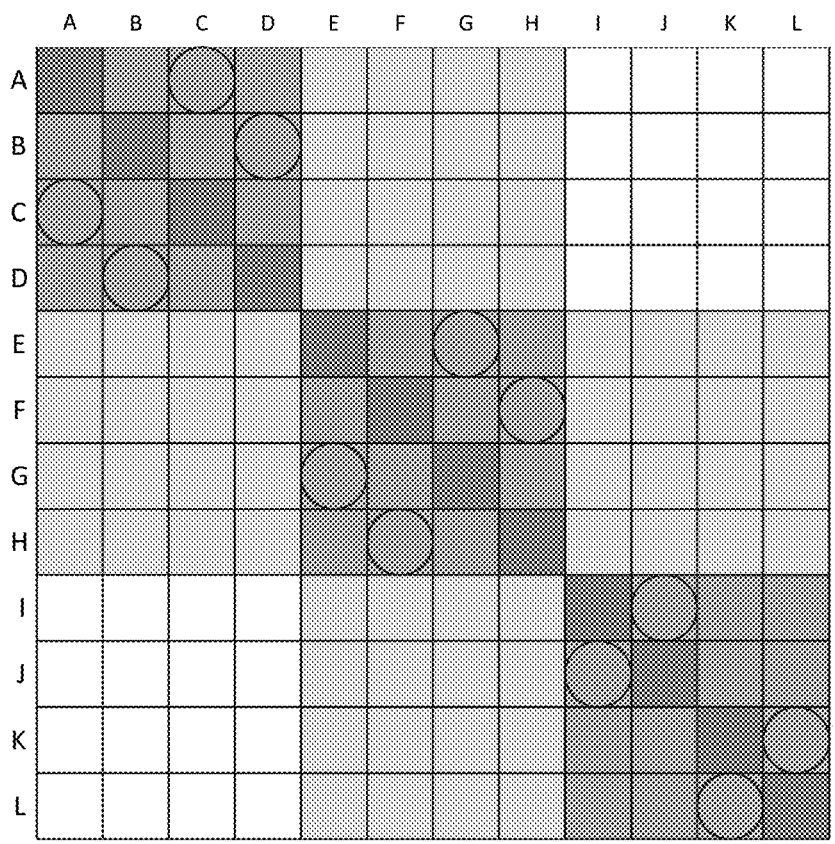
FIG. 10 illustrates a second iteration of a selection of unique pairs and links, in accordance with some embodiments.
Figure 10:
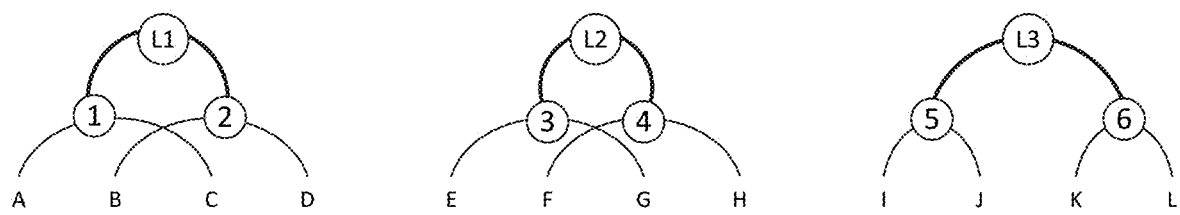

In some embodiments, as referred to above, ADRS 301 may iterate the pairing of branches and/or links multiple times. For example, as shown in FIG. 10, ADRS 301 may begin a next iteration by identifying the second highest scoring branch pair (e.g., removing the {A, B} pair from consideration). For example, as shown, ADRS 301 may establish a first unique pair between Branch A and Branch C and a second unique pair between Branch B and Branch D, based on the respective similarity scores associated with these branches. As shown, the remaining unique pairs may be the same as shown in FIGS. 8 and 9 (e.g., unique pairs between Branches E and G, between Branches F and H, between Branches I and J, and between Branches K and L).

During this second iteration, ADRS 301 may establish links between unique pairs, based on the comparison score associated with each unique pair. For example, as the similarity score associated with Branch A and Branch B is the highest, a link may be established between the {A, C} unique pair and the {B, D} unique pair. Other linked unique pairs may remain the same (e.g., as shown in FIG. 9).

In some embodiments, ADRS 301 may continue iterating the identification of unique pairs and/or links in a similar manner. As noted above, even when starting with different branches, some or all of the pairs and/or links may remain the same, while some of the identified pairs and/or links may differ. ADRS 301 may perform a correlation or similarity analysis of the pairs and/or links associated with each iteration, in order to determine a consensus set of pairs and links. That is, for example, pairs and/or links that are most frequently identified across iterations may be identified by ADRS 301 as the consensus set of pairs and/or links. As similarly described above, ADRS 301 may compare the consensus sets of pairs and/or links to a known configuration in order to identify mismatches, and may use this information to cause one or more remedial measures to be performed in case a mismatch is identified between pairs and/or links determined based on measured interference values (e.g., based on the iterative processes described above) and the expected configuration of the network.

Figure 11:
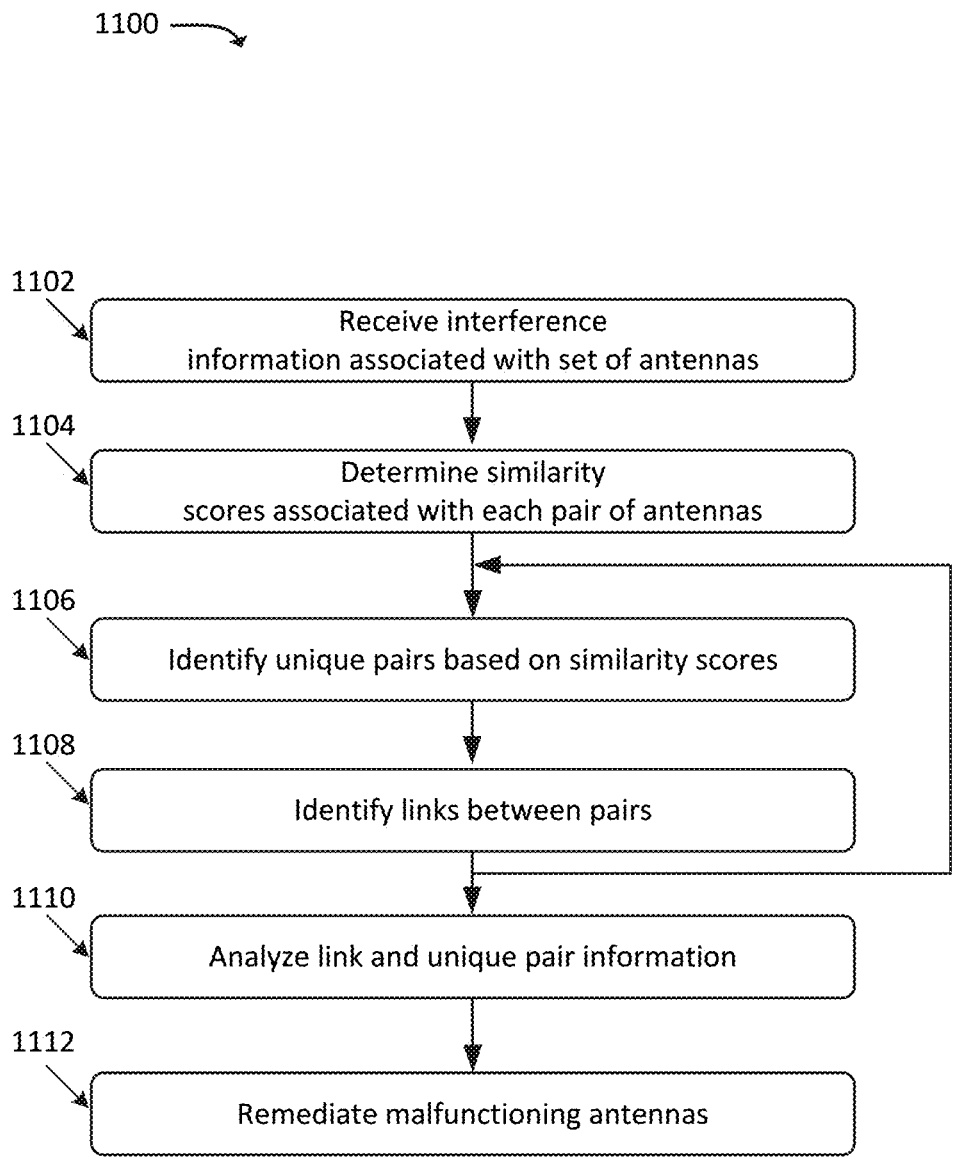
FIG. 11 illustrates an example process for identifying misaligned antennas or antenna pairs, in accordance with some embodiments.

FIG. 11 illustrates an example process 1100 for identifying and remediating misaligned antennas and/or antenna pairs. In some embodiments, some or all of process 1100 may be performed by ADRS 301. In some embodiments, one or more other devices may perform some or all of process 1100 (e.g., in concert with, and/or in lieu of, ADRS 301).

As shown, process 1100 may include receiving (at 1102) interference information associated with a set of antennas. In some embodiments, ADRS 301 may receive interference information from one or more other devices, such as a controller or other system associated with the antennas, such as an eNB, a gNB, and/or other elements of a RAN or a core of a wireless telecommunications network. In some embodiments, the interference information may be presented as raw data values, based on which ADRS 301 may generate one or more images that reflect the interference information. Additionally, or alternatively, ADRS 301 may receive (at 1102) one or more such images. As discussed above, the images may be normalized in terms of time window represented, size, resolution, and/or other suitable attributes. As discussed above, the set of antennas may be a co-located set of antennas (e.g., antennas located within a particular geographic region, antennas within a threshold distance of each other, antennas mounted on the same structure, etc.).

Process 1100 may further include determining (at 1104) similarity scores associated with each pair of antennas. For example, as discussed above, ADRS 301 may determine a SSIM or other suitable similarity score between the images, indicating the exhibited interference, associated with each pair of antennas.

Process 1100 may additionally include identifying (at 1106) unique pairs based on similarity scores. For example, as discussed above, ADRS 301 may start with the highest similarity score (e.g., between two antennas, as determined at 1104) and select pairs based on the score, in descending order (e.g., a first pair may be established between antennas having the highest similarity score, a second pair established between antennas having the second highest similarity score, etc.). As discussed above, once an antenna is added to a pair, it may be removed from consideration and may not be added to another pair.

Process 1100 may also include identifying (at 1108) links between the identified pairs. As discussed above, links may be selected based on the scores associated with the antennas of the unique pairs. For example, a link may be selected between unique pairs because two antennas associated with the unique pairs may have the second highest similarity score (e.g., where the highest similarity score is associated with the two antennas of one of the unique pairs). In some embodiments, a link may be selected based on similarity between the averages of the similarity scores associated with each unique pair.

In some embodiments, blocks 1106-1108 may iterate multiple times. Iterations may include, for example, identifying different unique pairs (compared to a previous iteration), identifying different links (compared to a previous iteration), and/or analyzing the new link and/or unique pair information. As discussed above, a consensus set of unique pairs and/or links may be identified after multiple iterations of blocks 1106-1108.

Process 1100 may further include analyzing (at 1110) unique pair and link information. As discussed above, unique pair and link information may be analyzed to determine faults with the branches and/or unique pairs. For example, unique pair and/or link information may be compared to an expected configuration. If a mismatch is identified, ADRS 301 may determine that one or more antennas are misaligned and/or otherwise malfunctioning.

In some embodiments, ADRS 301 may analyze the images for any antennas that have been identified as belonging to a pair or link that is different from an expected configuration. For example, ADRS 301 may determine a type of malfunction based on the images. For example, ADRS 301 may perform machine learning and/or other suitable techniques to classify the interference image for a given antenna as a particular type of interference. For example, certain attributes of the interference image may indicate issues such as a faulty antenna needing replacement (e.g., where no similarity score, between the antenna and other antennas, exceeds a threshold similarity score), a noisy antenna (e.g., where an overall level of interference associated with the antenna exceeds a threshold level), a silent antenna (e.g., where the overall level of interference associated with the antenna is below a threshold level), or other issues.

Process 1100 may additionally include remediating (at 1112) the malfunctioning antennas. For example, based on the analysis (e.g., performed at 1110), ADRS 301 may select a suitable remedial action, and initiate or perform the remedial action. For example, ADRS 301 may programmatically output an instruction to the malfunctioning antenna (and/or to a controller associated with the antenna) to cause the alignment of the antenna to shift. ADRS 301 may monitor the interference levels associated with the antenna, and/or may perform the iterative process described above, to determine whether the remediation was successful. ADRS 301 may iteratively modify the alignment of the antenna and analyze the resulting pairs and/or links (e.g., as determined according to the iterative process described above) in order to arrive at a suitable remediation (e.g., where the identified links and/or pairs match an expected configuration).

In some embodiments, performing the remediation may include generating and/or outputting an alert regarding the identified potential malfunction. For example, ADRS 301 may output an alert (e.g., an email, Short Message Service ("SMS") message, Multimedia Messaging Service ("MMS") message, application notification, or the like) to an operator, administrator, etc., indicating that the antenna and/or one or more antennas in a geographic region associated with the antenna is/are malfunctioning. In some embodiments, different operators, administrators, or the like, may be associated with antennas in different geographic locations, and ADRS 301 may determine an appropriate entity to which the alert should be forwarded based on the geographic location of the identified antenna.

Figure 12:
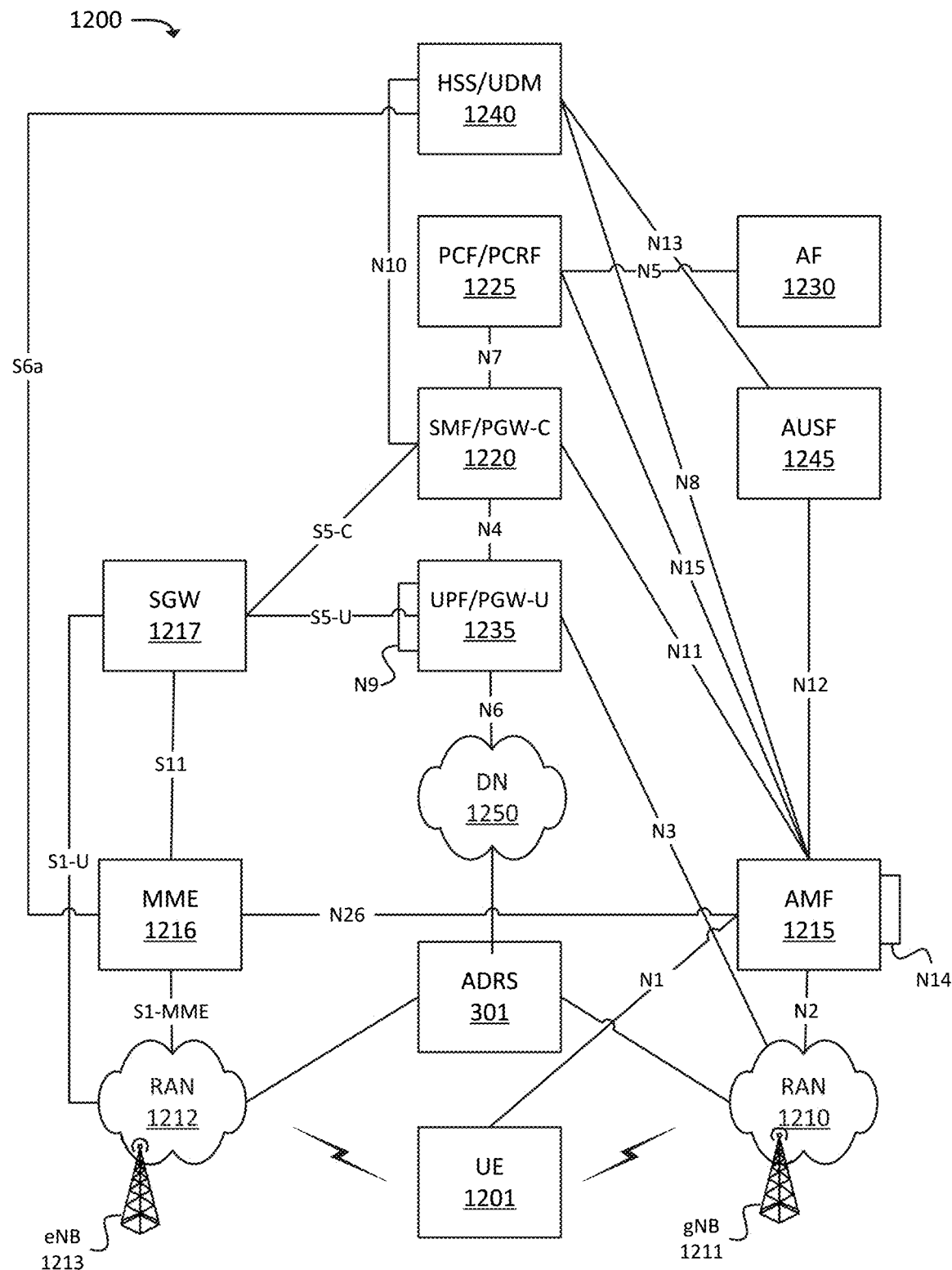
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1200 may include UE 1201, radio access network ("RAN") 1210 (which may include one or more Next Generation Node Bs ("gNBs") 1211), RAN 1212 (which may include one or more one or more evolved Node Bs ("eNBs") 1213), Access and Mobility Management Function ("AMF") 1215, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Home Subscriber Server ("HSS")/Unified Data Management ("UDM") 1240, Authentication Server Function ("AUSF") 1245, Data Network ("DN") 1250, and ADRS 301.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1201 may include a computation and communication device, such as a wireless mobile communication device that is capable of communicating with RAN 1210 and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 1201 may send traffic to and/or receive traffic (e.g., user plane traffic) from DN 1250 via RAN 1210 and UPF/PGW-U 1235.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, AMF 1215, and/or one or more other devices or networks) and may communicate the traffic to UE 1201 via the air interface.

RAN 1212 may be, or may include, an LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, SGW 517, and/or one or more other devices or networks) and may communicate the traffic to UE 1201 via the air interface.

AMF 1215 may include one or more devices, systems, Virtualized Network Functions ("VNFs"), etc., that perform operations to register UE 1201 with the 5G network, to establish bearer channels associated with a session with UE 1201, to hand off UE 1201 from the 5G network to another network, to hand off UE 1201 from the other network to the 5G network, and/or to perform other operations. In some embodiments, the 5G network may include multiple AMFs 1215, which communicate with each other via the N14 interface (denoted in FIG. 12 by the line marked "N14" originating and terminating at AMF 1215).

SGW 517 may include one or more devices, systems, VNFs, etc., that aggregate traffic received from one or more eNBs 1213 and send the aggregated traffic to an external network or device via UPF/PGW-U 1235. Additionally, SGW 517 may aggregate traffic received from one or more UPF/PGW-Us 1235 and may send the aggregated traffic to one or more eNBs 1213. SGW 517 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, etc., that gather, process, store, and/or provide information in a manner described herein. SMF/PGW-C 1220 may, for example, facilitate in the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, etc., that receive, store, and/or provide information that may be used in determining parameters (e.g., quality of service parameters, charging parameters, or the like) for certain applications.

UPF/PGW-U 1235 may include one or more devices, systems, VNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

ADRS 301 may include one or more devices, systems, VNFs, etc., that measure and analyze interference signal patterns associated with radio nodes (e.g., eNB 1213, gNB 1211, individual antennas associated with eNB 1213 and/or gNB 1211, etc.). As described herein, ADRS 301 may identify misaligned and/or otherwise malfunctioning radio nodes, and may effect remedial action to correct misalignments or other malfunctions.

Figure 13:
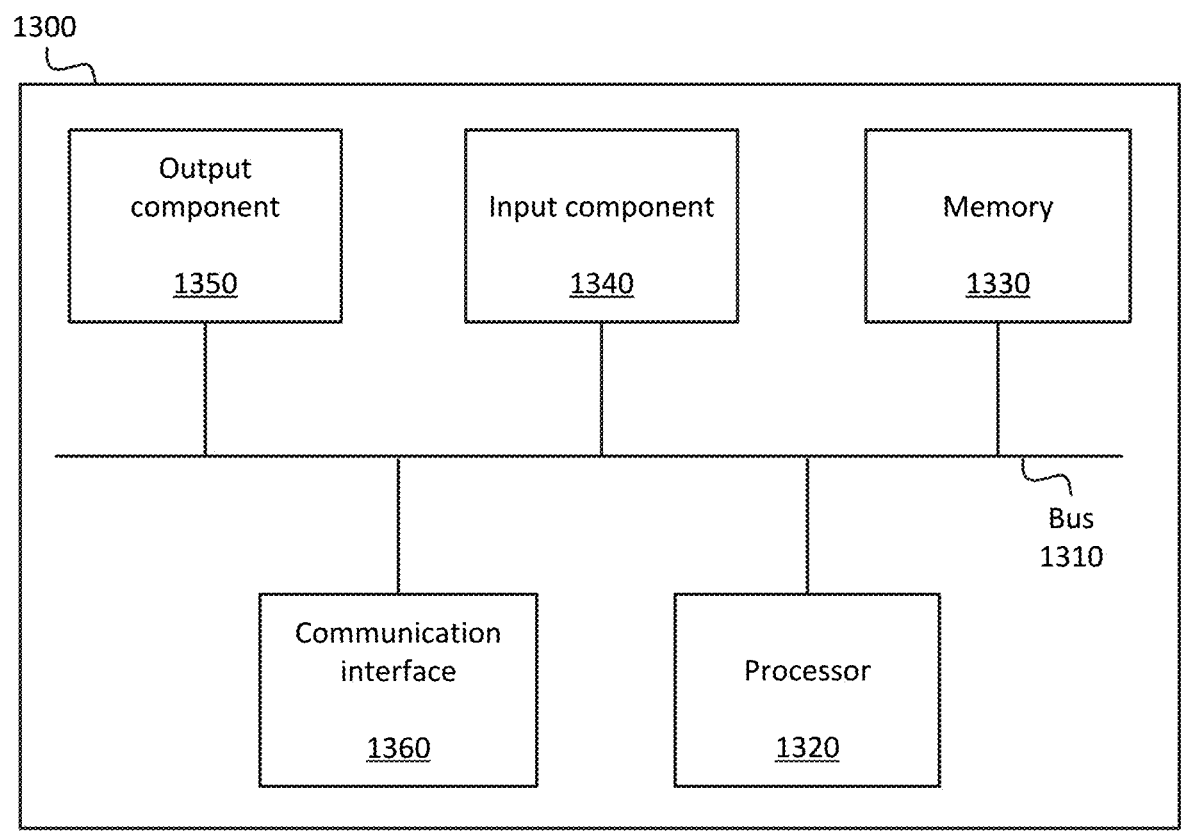
FIG. 13 illustrates example functional components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 3 and 11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      receive a first set of image information associated with a first antenna of a particular antenna pair, the first set of image information indicating interference information associated with the first antenna over a particular time window;
      receive a second set of image information associated with a second antenna of the particular antenna pair, the second set of image information indicating interference information associated with the second antenna over the particular time window;
      receive a plurality of sets of image information indicating interference information associated with a respective plurality of antennas over the particular time window, the plurality of sets of image information including:
         the second set of image information, and
         at least a third set of image information;
      compare the first set of image information to the plurality of sets of image information;
      determine, based on the comparing, a respective measure of similarity between the first set of image information and each set of image information of the plurality of sets of image information;
      identify that the second set of image information has a highest measure of similarity to the first set of image information, as compared to other sets of image information of the plurality of sets of image information;
      determine, based on identifying that the second set of image information has the highest measure of similarity to the first set of image information, that the first and second antennas are the particular antenna pair in a wireless network that utilizes a plurality of antenna pairs;
      identify, based on the measure of similarity between the first set of image information and the second set of image information, a malfunction associated with the particular antenna pair; and
      perform one or more remedial measures based on the identified malfunction.

2. The device of claim 1, wherein the wireless network utilizes the plurality of antenna pairs in a Multiple-Input Multiple-Output ("MIMO") system.

3. The device of claim 1, wherein the one or more remedial measures includes realigning at least one of the first antenna or the second antenna.

4. The device of claim 1, wherein determining the measure of similarity between the first set of image information and the second set of image information includes generating one or more Structural Similarity Index ("SSIM") scores for the first and second sets of image information.

5. A device, comprising:
   one or more processors configured to:
      receive a first set of image information associated with a first antenna of a particular antenna pair, the first set of image information indicating interference information associated with the first antenna over a particular time window;

receive a second set of image information associated with a second antenna of the particular antenna pair, the second set of image information indicating interference information associated with the second antenna over the particular time window;

determine a measure of similarity between the first set of image information and the second set of image information;

determine that the first set of image information has a higher measure of similarity to a third set of image information, indicating interference information associated with a third antenna over the particular time window, than to the second set of image information;

identify, based on the measure of similarity between the first set of image information and the second set of image information, a malfunction associated with the particular antenna pair, wherein identifying the malfunction is further based on determining that the first set of image information has the higher measure of similarity to the third set of image information than to the second set of image information; and perform one or more remedial measures based on the identified malfunction.

6. The device of claim 5, wherein performing the one or more remedial measures includes:

realigning the first antenna based on determining that the first set of image information has the higher measure of similarity to the third set of image information than to the second set of image information.

7. The device of claim 5, wherein determining the measure of similarity between the first set of image information and the second set of image information includes generating one or more Structural Similarity Index ("SSIM") scores for the first and second sets of image information.

8. The device of claim 5, wherein the particular antenna pair is associated with a Multiple-Input Multiple-Output ("MIMO") system.

9. A non-transitory computer-readable medium, storing a plurality of processor-executable instructions to:

receive a first set of image information associated with a first antenna of a particular antenna pair, the first set of image information indicating interference information associated with the first antenna over a particular time window;

receive a second set of image information associated with a second antenna of the particular antenna pair, the second set of image information indicating interference information associated with the second antenna over the particular time window;

determine a measure of similarity between the first set of image information and the second set of image information;

determine that the first set of image information has a higher measure of similarity to a third set of image information, indicating interference information associated with a third antenna over the particular time window, than to the second set of image information;

identify, based on the measure of similarity between the first set of image information and the second set of image information, a malfunction associated with the particular antenna pair, wherein identifying the malfunction is further based on determining that the first set of image information has the higher measure of similarity to the third set of image information than to the second set of image information; and perform one or more remedial measures based on the identified malfunction.

10. The non-transitory computer-readable medium of claim 9, wherein the plurality of processor-executable instructions further include processor-executable instructions to:

receive a plurality of sets of image information indicating interference information associated with a respective plurality of antennas over the particular time window;

compare the first set of image information to the plurality of sets of image information;

determine, based on the comparing, a respective measure of similarity between the first set of image information and each set of image information of the plurality of sets of image information;

identify that the second set of image information has a highest measure of similarity to the first set of image information, as compared to other sets of image information of the plurality of sets of image information; and determine, based on identifying that the second set of image information has the highest measure of similarity to the first set of image information, that the first and second antennas are the particular antenna pair in a wireless network that utilizes a plurality of antenna pairs.

11. The non-transitory computer-readable medium of claim 10, wherein the wireless network utilizes the plurality of antenna pairs in a Multiple-Input Multiple-Output ("MIMO") system.

12. The non-transitory computer-readable medium of claim 9, wherein determining the measure of similarity between the first set of image information and the second set of image information includes generating one or more Structural Similarity Index ("SSIM") scores for the first and second sets of image information.

13. The non-transitory computer-readable medium of claim 9, wherein performing the one or more remedial measures includes:

realigning the first antenna based on determining that the first set of image information has the higher measure of similarity to the third set of image information than to the second set of image information.

14. A method, comprising:

receiving a first set of image information associated with a first antenna of a particular antenna pair, the first set of image information indicating interference information associated with the first antenna over a particular time window;

receiving a second set of image information associated with a second antenna of the particular antenna pair, the second set of image information indicating interference information associated with the second antenna over the particular time window;

receiving a plurality of sets of image information indicating interference information associated with a respective plurality of antennas over the particular time window, the plurality of sets of image information including:
the second set of image information, and
at least a third set of image information;

comparing the first set of image information to the plurality of sets of image information;

determining, based on the comparing, a respective measure of similarity between the first set of image information and each set of image information of the plurality of sets of image information;

identifying that the second set of image information has a highest measure of similarity to the first set of image information, as compared to other sets of image information of the plurality of sets of image information;

determining, based on identifying that the second set of image information has the highest measure of similarity to the first set of image information, that the first and second antennas are the particular antenna pair in a wireless network that utilizes a plurality of antenna pairs;

identifying, based on the measure of similarity between the first set of image information and the second set of image information, a malfunction associated with the particular antenna pair; and performing one or more remedial measures based on the identified malfunction.

15. The method of claim 14, wherein the one or more remedial measures includes realigning at least one of the first antenna or the second antenna.

16. The method of claim 14, wherein determining the measure of similarity between the first set of image information and the second set of image information includes generating one or more Structural Similarity Index ("SSIM") scores for the first and second sets of image information.

17. A method, comprising:
receiving a first set of image information associated with a first antenna of a particular antenna pair, the first set of image information indicating interference information associated with the first antenna over a particular time window;

receiving a second set of image information associated with a second antenna of the particular antenna pair, the second set of image information indicating interference information associated with the second antenna over the particular time window;

determining a measure of similarity between the first set of image information and the second set of image information;

determining that the first set of image information has a higher measure of similarity to a third set of image information, indicating interference information associated with a third antenna over the particular time window, than to the second set of image information;

identifying, based on the measure of similarity between the first set of image information and the second set of image information, a malfunction associated with the particular antenna pair, wherein identifying the malfunction is further based on determining that the first set of image information has the higher measure of similarity to the third set of image information than to the second set of image information; and performing one or more remedial measures based on the identified malfunction.

18. The method of claim 17, wherein performing the one or more remedial measures includes:
realigning the first antenna based on determining that the first set of image information has the higher measure of similarity to the third set of image information than to the second set of image information.

19. The method of claim 17, wherein determining the measure of similarity between the first set of image information and the second set of image information includes generating one or more Structural Similarity Index ("SSIM") scores for the first and second sets of image information.

20. The method of claim 17, wherein the particular antenna pair is associated with a Multiple-Input Multiple-Output ("MIMO") system.

* * * * *